C. J. HOKANSON.
HAY RACK AND UNLOADER.
APPLICATION FILED MAR. 13, 1919.
1,368,931.
Patented Feb. 15, 1921.
4 SHEETS—SHEET 4.
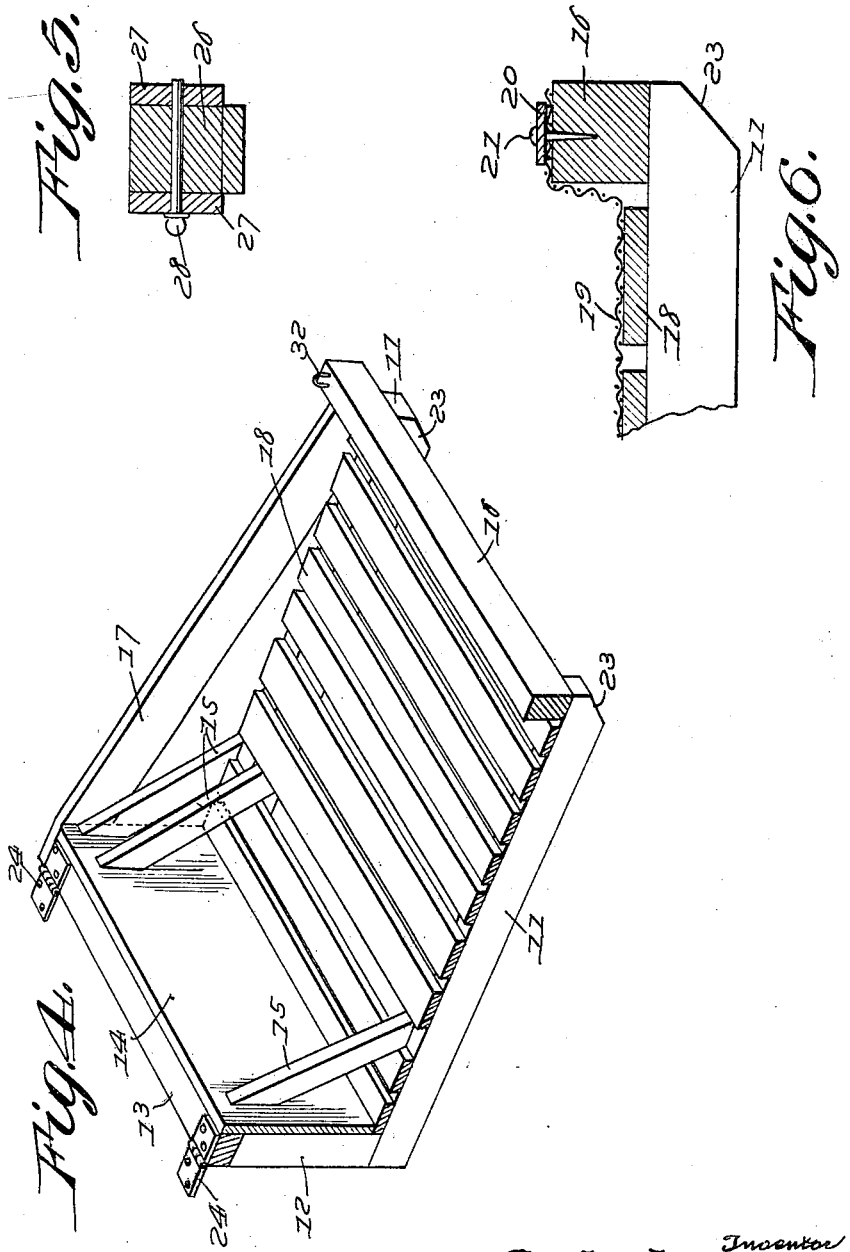

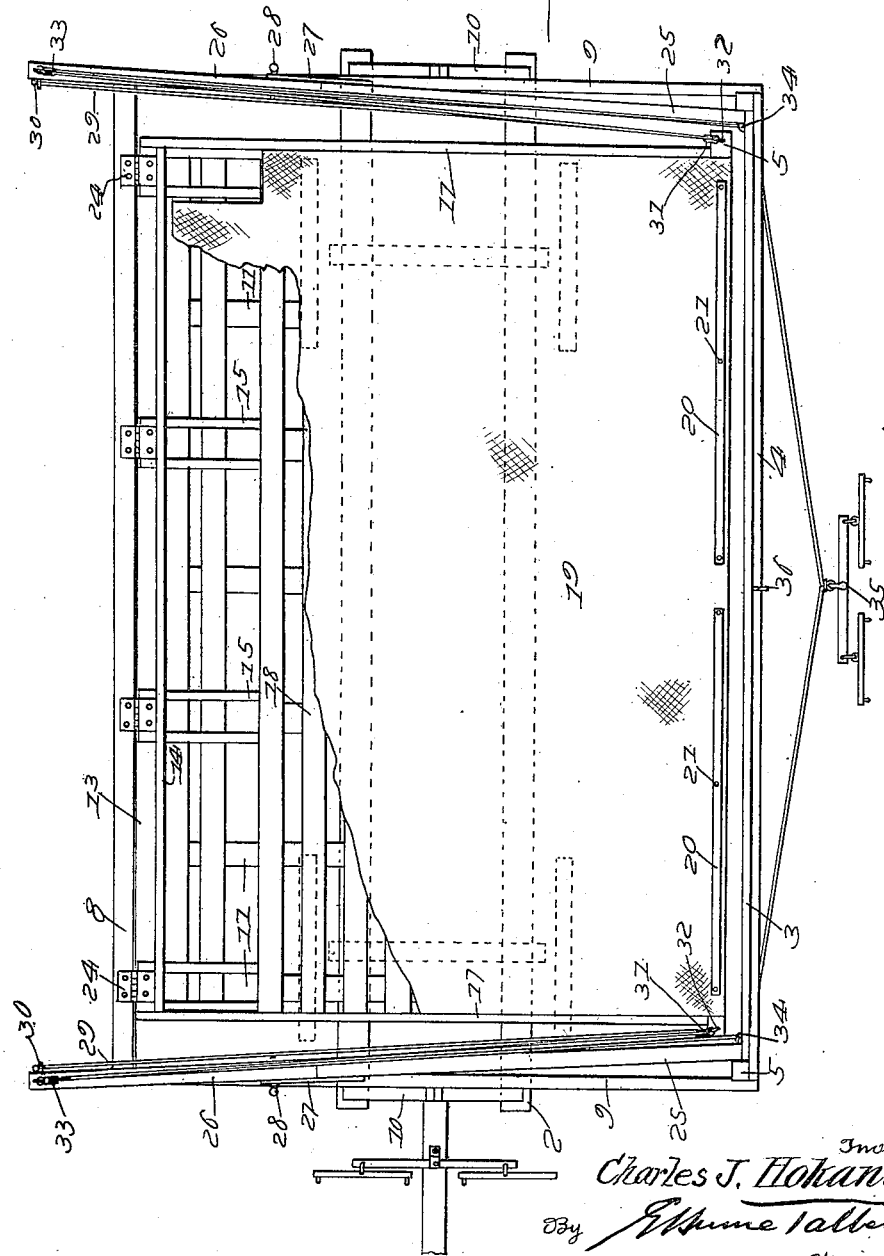

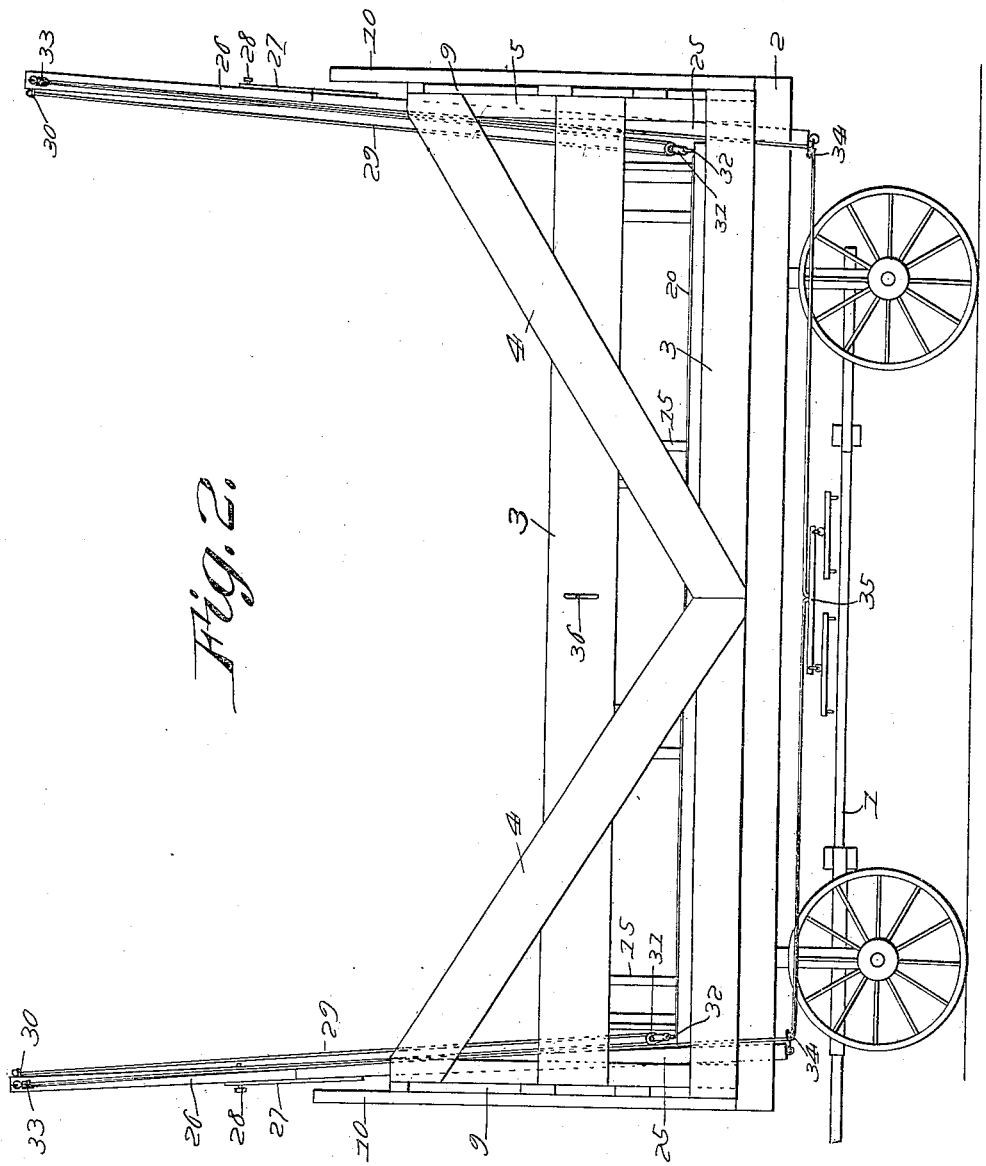

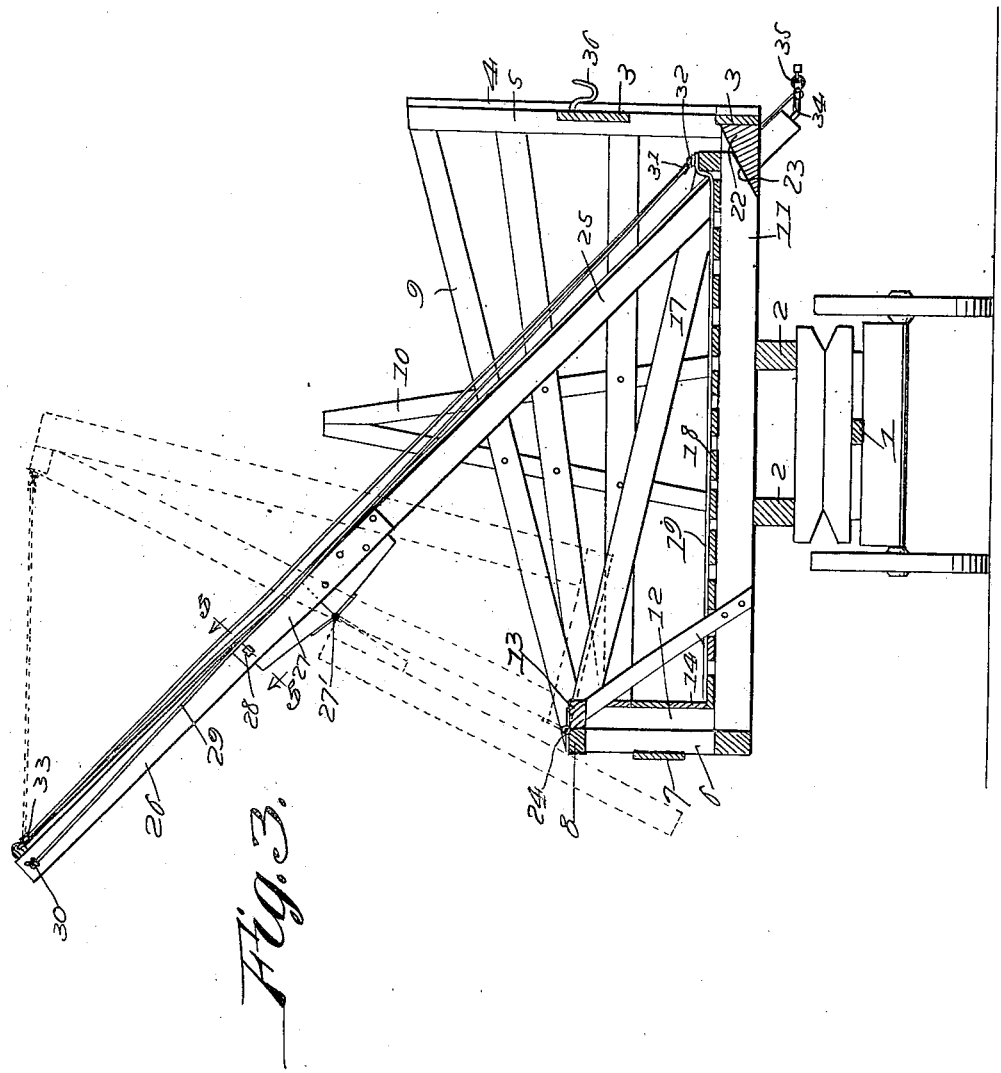

UNITED STATES PATENT OFFICE.

CHARLES J. HOKANSON, OF CROOKSTON, MINNESOTA.

HAY RACK AND UNLOADER.

1,368,931.  Specification of Letters Patent.  Patented Feb. 15, 1921.

Application filed March 13, 1919. Serial No. 282,507.

*To all whom it may concern:*

Be it known that I, CHARLES J. HOKANSON, a citizen of the United States of America, residing at Crookston, in the county of Polk and State of Minnesota, have invented new and useful Improvements in Hay Racks and Unloaders, of which the following is a specification.

The purpose of the invention is to provide a hay rack and running gear therefor, the hay rack comprising a movable bottom section on which the load of hay rests, this movable section being adapted for raising at the side of the rack and casting off from the side of same a load of hay previously carried in the rack. To provide for raising the said bottom section to effect the casting off of the load, there are provided diagonally inclined standards at the forward and rear ends of the rack, these standards supporting rope gear connected with the movable bottom and connecting also with a whiffle tree carried at the side of the rack, so that the draft animals may be unhitched from the running gear and hitched to the rope gear to effect the raising of the movable bottom. The diagonally disposed standards referred to are formed of hingedly mounted sections which permit the standards to be folded so as to be reduced in height to permit the rack passing under trolley wires and other aerial obstructions when it is drawn through cities or other places where obstructions are likely to occur.

A further purpose of the invention seeks an apparatus of this character, which is simple in construction, durable and effective in operation and inexpensive to manufacture, and to place on the market.

Other and further purposes appear in the following description, wherein the invention is set forth in detail.

The same numerals of reference designate the same parts throughout the several figures of drawings, wherein:

Figure 1 is a plan view of the improved apparatus.

Fig. 2 is a side elevational view thereof.

Fig. 3 is a vertical transverse sectional view.

Fig. 4 is a perspective view of a section of the movable bottom.

Fig. 5 is a section on the line 5—5 of Fig. 3.

Fig. 6 is a detail sectional view to illustrate the manner in which the movable bottom is covered to prevent the dropping of grain or the material carried by the apparatus through the spaced slats which form the floor of the said movable bottom.

Referring to the drawings, the invention is shown as comprising a running gear 1, which is of the usual construction provided for hay racks and the like. Mounted on this running gear there is the rack proper, this rack comprising the side sills 2 suitably interconnected at the forward and rearward ends by transverse sills not particularly illustrated in the drawings, but unnecessary to an understanding of the invention.

In order to retain the load in the rack it is provided on one side with a plurality of rails 3 and 4 connecting with the corner posts 5 on that side, the rails 4 acting as bracing members for the posts, as well as for the rails 3. On the opposite side of the rack much shorter corner posts 6 are provided, and these are interconnected by a slat 7, a longitudinal rail 8 being laid on the upper ends of the posts and connected thereto. Both at the forward and rear ends of the rack, inclined slats 9 are extended from the posts 5 to the opposite posts 6 and the usual ladders are secured to these slats at the forward and rear ends to receive the pole usually employed to secure hay or grain in the rack when once loaded thereon.

The rack is provided with a movable bottom, which is hingedly connected with the rail 8, and this movable bottom comprises a plurality of transversely disposed bars 11, which at one end connect with upstanding bars 12, all the latter being topped with a longitudinally extending bar or rail 13, which lies parallel with and adjacent the rail 8, being similarly dimensioned to the latter. A plate 14 is attached in any suitable manner to all the upright bars 12 and the longitudinal bar 13 and forms a closed side for the rack at the low side of the latter. In order to strengthen the connection between the upright bars 12 and the transverse bars 11, the diagonally disposed brace members 15 are employed, these being attached in any suitable manner to the bars 12 and to the bar 11. At the side opposite the plate 14, the movable bottom carries a longitudinal rail 16 connecting all of the transverse bars 11 and secured on the upper edges of the latter. In addition to the brace members 15, there is provided a brace member 17 carried at the forward and rear ends of the movable bottom and extending from the rail 13 to the ends of the foremost and rearmost transverse bars 11. The spaced slats 18 secured to the transverse bars 11 form the flooring of the movable bottom and laid on top of these slats there is a canvas or fabric covering 19, which is appropriately secured to the slat 18 lying adjacent the plate 14 and carried to and laid on top of the upper edge of the bar 16 to which it is secured by a strap 20 and fasteners 21 which pass through the strap and through the fabric and enter the bar 16.

On one of the rails 3 and on the inner face thereof there is attached a rail 22 which is triangular in cross sections, this rail being designed for abutment by the diagonally disposed ends 23 of the bars 11. This rail 22 thus serves to support the movable bottom at one side, the hinges 24 supporting the same at the opposite side, the hinges being secured to both the rails 13 and 8 and permitting the movable bottom to be raised on the hinges as a pivot until it assumes a vertical position or a position sufficient to cast from the side of the apparatus the load carried therein.

To provide for raising and lowering the movable bottom 2 diagonally disposed standards 25 are employed, these standards being mounted one at the forward and one at the rearward end of the rack and appropriately secured thereto. These standards comprise two sections, the upper section 26 of which is hingedly connected to the lower section, as indicated at 27. The upper section may thus be swung into alinement with the lower section or else allowed to hang in a depending position from the lower section for the obvious purpose of providing against its coming in contact and interfering with aerial obstructions that the apparatus may encounter in passing through city streets or beneath telegraph or telephone wires in the rural districts. On opposite faces of the lower section of the standards 25 there are secured the plates 27, these plates overlapping the upper section 26 when it is in alinement with the lower section. These plates serve to secure the upper and lower sections in alinement and are provided with holes through which a pin 28 is passed, this pin also passing through a hole in the section 26 when the section is in raised position. By this means the sections 26 are rigidly held in extended position, being readily lowered when the pins are withdrawn, as shown by dotted lines in Fig. 3.

To provide for raising the movable bottom or cast off the load suitable hoisting ropes 29 are employed, one end of each of these ropes being anchored at the upper end of each section 26, as indicated at 30. These ropes are led downward and trained over sheave pulleys 31 secured to the movable bottom by means of staples 32 at opposite ends of the rails 16. The ropes are then led upward and trained over similar sheave pulleys 33 carried at the upper ends of the sections 26, the ropes being again led downward and trained over sheave pulleys 34 carried at the lower ends of the standards 25. The extremities of the ropes 29 are led to and connect with a whiffle tree 35 provided to permit draft animals being hitched to the ropes for the obvious purpose of raising the movable bottom on hinged connections as indicated by dotted lines in Fig. 3.

When the upper sections of the standards are lowered, the ropes 29 will, per force, be slack, even though the movable bottom be in its lowered position. These slack ropes would permit the whiffle tree 35 to drag upon the ground when the apparatus was being transported, were it not for the hook 36 carried by the upper rail, which hook provides a supporting means for the whiffle tree when the ropes are slack.

The invention having been described, what is claimed as new and useful is:

1. In an apparatus of the kind specified, a running gear, a rack carried by the running gear, a hingedly mounted bottom for the rack for elevation at one side of the latter for casting off the load carried in the rack, standards carried by the rack, sheave pulleys carried by the standards, ropes having one end secured to the standard and being trained over the pulleys, pulleys carried by the movable bottom over which the said ropes are trained, and a whiffle tree to which the remaining ends of the ropes connect.

2. In an apparatus of the kind set forth, a hay or grain rack, a movable bottom for the rack hingedly attached to the latter at one side thereof, diagonally disposed standards mounted at the forward and rear ends of the rack, extension sections hingedly attached to the standards at the upper ends so that they may be swung into position in alinement with the standards or into depending positions, plates attached on opposite sides of the standards and overlapping the extension sections when the latter are in alinement with the standards, detachable pins passing through the extension sections and through the overlapping ends of the plates, hoisting ropes carried by the standard and their extension sections and operatively connected with the movable bottom, and a whiffle tree connected with the ropes for the useful purpose specified.

In testimony whereof I affix my signature.

CHARLES J. HOKANSON.